(12) United States Patent
     Lull

(10) Patent No.: US 9,562,796 B2
(45) Date of Patent: Feb. 7, 2017

(54) ABSOLUTE AND DIFFERENTIAL PRESSURE TRANSDUCER

(71) Applicant: ILLINOIS TOOL WORKS INC., Glenview, IL (US)

(72) Inventor: John M. Lull, Fullerton, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/915,656

(22) PCT Filed: Aug. 18, 2014

(86) PCT No.: PCT/US2014/051560
§ 371 (c)(1),
(2) Date: Mar. 1, 2016

(87) PCT Pub. No.: WO2015/034663
PCT Pub. Date: Mar. 12, 2015

(65) Prior Publication Data
US 2016/0195415 A1    Jul. 7, 2016

Related U.S. Application Data

(60) Provisional application No. 61/874,830, filed on Sep. 6, 2013.

(51) Int. Cl.
    *G01F 1/38* (2006.01)
    *G01F 1/48* (2006.01)
    (Continued)

(52) U.S. Cl.
    CPC . *G01F 1/38* (2013.01); *G01F 1/48* (2013.01); *G01F 1/50* (2013.01); *G01F 15/002* (2013.01);
    (Continued)

(58) Field of Classification Search
    USPC .................................. 73/861.1, 718, 706
    See application file for complete search history.

(56) References Cited

U.S. PATENT DOCUMENTS 6,484,585 B1 * 11/2002 Sittler ................... G01L 9/0075
                                                            73/718
6,520,020 B1 *  2/2003 Lutz .................... G01L 9/0075
                                                            73/706

(Continued)

FOREIGN PATENT DOCUMENTS

WO      2005093378 A2    10/2005

OTHER PUBLICATIONS

ISR and WO for PCT/US2014/051560 mailed Mar. 2, 2015.

*Primary Examiner* — Jewel V Thompson

(57) ABSTRACT

The disclosed embodiments include a combination absolute pressure and differential pressure transducer that includes at least a first cavity and a second cavity, at least a first pressure port and a second pressure port, a first isolation membrane exposing the first cavity to a first fluid pressure applied to the first pressure port, a second isolation membrane exposing the second cavity to a second fluid pressure applied to the second pressure port, at least one absolute pressure sense element exposed to absolute pressure in one of the first cavity and the second cavity, and at least one differential pressure sense element exposed to differential pressure between two of the first cavity and the second cavity.

20 Claims, 5 Drawing Sheets

(51) Int. Cl.
*G01F 15/00* (2006.01)
*G01L 9/00* (2006.01)
*G01L 19/00* (2006.01)
*G01F 1/50* (2006.01)

(52) U.S. Cl.
CPC ......... *G01L 9/0054* (2013.01); *G01L 19/0046* (2013.01); *G01L 19/0092* (2013.01)

(56) References Cited

U.S. PATENT DOCUMENTS

| | | |
|---|---|---|
| 2005/0204822 A1 | 9/2005 | Schumacher |
| 2006/0086194 A1 | 4/2006 | Olin et al. |
| 2011/0296926 A1 | 12/2011 | Schulte et al. |

* cited by examiner

ABSOLUTE AND DIFFERENTIAL PRESSURE TRANSDUCER

RELATED APPLICATIONS

The present application is National Phase of International Application No. PCT/US2014/051560, filed Aug. 18, 2014, and claims the benefit of U.S. Provisional Application No. 61/874,830, filed Sep. 6, 2013.

BACKGROUND

1. Field of the Invention

The present invention relates generally to methods and systems for controlling the mass flow rate of a fluid, and more particularly to the operation of mass flow controllers and mass flow meters for gases and other compressible fluids.

2. Discussion of the Related Art

Many industrial processes require precise control of various process fluids. For example, in the semiconductor industries, mass flow meters and controllers using them are used to precisely measure and control the amount of a process fluid that is introduced to a process chamber. A wide variety of techniques can be measured to mass flow rate in such devices, including thermal, ultrasonic time-of-flight, coriolis, and pressure-based techniques.

Pressure-based mass flow meters use a defined flow restriction to create a pressure drop responsive to the flow to be measured, and use measurements of temperature, the resulting pressure drop, and (for compressible fluids) absolute pressure, combined with knowledge of both fluid properties and the flow restriction, to calculate mass flow rate.

The term "fluid" is used herein to describe any type of matter in any state capable of flow. The term "gas" is used herein to describe any fluid for which density is substantially dependent on absolute pressure, such as ideal or non-ideal gases, vapors, and supercritical fluids. The term "liquid" is used herein to describe any fluid for which density is not substantially dependent on absolute pressure.

SUMMARY

The disclosed embodiments include a combination absolute pressure and differential pressure transducer that includes at least a first cavity and a second cavity, at least a first pressure port and a second pressure port, a first isolation membrane exposing the first cavity to a first fluid pressure applied to the first pressure port, a second isolation membrane exposing the second cavity to a second fluid pressure applied to the second pressure port, at least one absolute pressure sense element exposed to absolute pressure in one of the first cavity and the second cavity, and at least one differential pressure sense element exposed to differential pressure between two of the first cavity and the second cavity.

In one embodiment, the first and second pressure ports are seals or sealing surfaces completely surrounding the first and second isolation membranes. Many other types of pressure ports are possible and suitable as well, including rigid covers for the isolation membrane including appropriate seals or sealing surfaces, and rigid or flexible pipes.

In one embodiment, the first and second isolation membranes are flexible corrugated metal diaphragms. Many other types of isolation membranes are possible and suitable as well, such as flexible metal bellows and elastomeric diaphragms or bellows.

In one such embodiment, the ports consist of sealing surfaces completely surrounding the isolation membranes, and the isolation membranes are flexible corrugated metal diaphragms having a precisely-specified profile that is slightly proud of a mounting face of the transducer body.

In one embodiment, the first and second cavities are filled with a silicone-based oil.

In one embodiment, the absolute and differential pressure sensing elements consist of micro-machined silicon elements using silicon strain gauges. Many other types of pressure sensing elements are suitable as well, such as appropriately-supported diaphragms with metal film strain gauges, or capacitance pressure gauges.

In some embodiments, the combination absolute pressure and differential pressure transducer may also include a temperature sensor. The combination absolute and differential pressure transducer may be configured to use the temperature sensor to compensate for any gauge temperature coefficient, and/or the device using the combination transducer may be configured to use the temperature reported by the sensor as a proxy for the temperature of the fluid whose flow is being measured.

In some embodiments, the combination absolute pressure and differential pressure transducer also includes a circuit board mounted to the transducer body. The circuit board may have memory components that are configured to store data such as, but not limited to, calibration data for the combination absolute pressure and differential pressure transducer. The circuit board may include one or more accelerometers to allow automatic correction for the effects of gravity or acceleration on the measured pressures. The circuit board may also include instrumentation amplifiers or other amplifiers configured to amplify output signals of the absolute pressure sense element and the differential pressure sense element, as well as other components.

The above summary merely provides examples of particular embodiments disclosed herein and is not intended to be exhaustive or limit the scope of the claims. Other embodiments and advantages of the disclosed embodiments will be further described in the detailed description.

BRIEF DESCRIPTION OF THE DRAWINGS

Illustrative embodiments of the present invention are described in detail below with reference to the attached drawing figures, which are incorporated by reference herein, and wherein.

Figure 1:
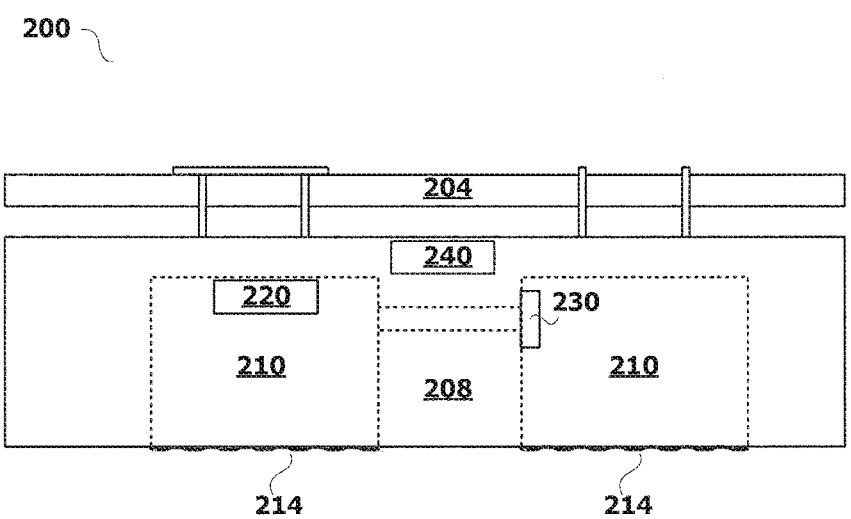
FIG. 1 illustrates a cross section view of a combination absolute and differential pressure transducer in accordance with one embodiment of the claimed inventions.

The illustrated figures are only exemplary and are not intended to assert or imply any limitation with regard to the environment, architecture, design, or process in which different embodiments may be implemented.

DETAILED DESCRIPTION

Pressure-based mass flow controllers (MFCs) and mass flow meters (MFMs) for gases typically utilize some form of a flow restrictor and two or more pressure transducers placed in suitable locations to allow calculation of pressure both upstream and downstream of the flow restrictor.

For instance, many pressure-based MFMs use a type of flow restrictor known as a laminar flow element whose performance is predominantly determined by its laminar flow characteristics, rather than by velocity head (the pressure drop required to accelerate the gas to its velocity in the restrictor). To a first order, the flow rate of an ideal gas through a laminar flow element can be calculated as:

$$Qs=K*(Pu^2-Pd^2)$$

Where:

Qs is the mass flow rate

K is a value dependent on temperature, viscosity, and compressibility of the gas, and geometry of the laminar flow element Pu is the absolute pressure upstream of the laminar flow element Pd is the absolute pressure downstream of the laminar flow element This characteristic is highly advantageous when Pd is a low value—that is, when the downstream pressure is a small fraction of the upstream pressure—because it takes a relatively large upstream pressure to give a flow rate equal to a small percentage of the device range. For example, if the flow restrictor provides a pressure drop of 1000 Torr (about 20 PSIA) at full scale, into a vacuum, a pressure drop of 100 Torr into vacuum provides only 1% of full-scale flow. This allows good measurement of low flow rates into vacuum, because the resulting pressure drop is relatively large for even relatively low flow rates.

However, when the outlet pressure increases, the pressure drop of the laminar flow element decreases substantially. In our example case, for example, with atmospheric pressure (760 Torr) downstream of the laminar flow element, the pressure drop at 1% of full-scale flow drops to only 6.55 Torr. That is less than 7% of the pressure drop of the element at the same flow rate with vacuum downstream of the element, and far less than 1% of the transducer range required for this configuration. This characteristic substantially degrades accuracy of the flow meter at high outlet pressures, compared to its performance with vacuum at the outlet.

Additionally, mass flow controllers (MFCs) using such MFMs suffer from the same issue.

Typical pressure-based MFCs and MFMs using a laminar flow element use two independent absolute pressure transducers—one upstream of the laminar flow element, and one downstream of the element. However, for an MFC built this way to perform well across a wide range of outlet pressures, it is critical that the two pressure transducers be precisely matched. They need not only to be zeroed accurately, but they also need to have matching gains and matching nonlinearities. Any difference between gain or nonlinearity of the two transducers will produce a shift in the zero of the flow meter as the outlet pressure changes, as will any difference in the zero of the two transducers.

Pressure-based MFCs and MFMs using critical flow nozzles, orifices, or other non-laminar flow elements suffer even worse degradation when used at low flow rates and even moderately high outlet pressure.

Typical pressure-based MFCs and MFMs have dealt with this issue using two different strategies.

The first approach, typically used in metrology-grade MFMs, is to use extremely accurate and expensive transducers. As an example, the MolBox™ (the electronics half of a pressure-based mass flow meter produced by DHI®) uses two quartz-crystal-based DigiQuartz® pressure transducers produced by Paro Scientific. These are high performance transducers well known for their accuracy and stability but at substantial cost. Such transducers are used in other extreme-precision applications as well, such as tsunami detectors capable of detecting a change in water depth of less than 1 cm from the sea floor thousands of meters below, and in at least one NIST™ (National Institutes of Science & Technology) laminar flow meter using quartz capillaries as the laminar flow element.

Most inexpensive small pressure-based MFCs (such as the Horiba D200™ series) and MFMs use much less expensive absolute pressure transducers and largely rely on a fairly drastic loosening of accuracy specs at high outlet pressures. The D200 series, for example, guarantees accuracy of 0.05% of full scale down to a 0.5% setpoint when the outlet pressure is below 13.3 kPa (~100 Torr), but only 0.1% of full scale and only down to 2% setpoint when the outlet pressure is between 13.3 and 53.3 kPa (~400 Torr).

Devices using both strategies also rely on periodic "taring" of the transducers adjusting the zero offset of one or both transducers to give identical pressure readings when both transducers are exposed to the same pressure). Proper taring, at actual operating outlet pressure, is capable of significantly improving performance of these devices at the outlet pressure used for taring. But many MFC and MFM applications require performance across a relatively wide range of outlet pressures (e.g., from vacuum to 400 Torr). Taring is capable of ensuring proper correction only at one pressure within that range—the pressure at which taring was done. Any gain or nonlinearity differences between the transducers will introduce increasing errors as the outlet pressure deviates from the pressure at which taring was performed.

One way to significantly improve performance of a pressure-based MFC or MFM is to replace one of the absolute transducers with a differential transducer capable of directly reporting the pressure drop across the element. This does not completely eliminate the need for taring, as it's still necessary to periodically adjust zero of the differential transducer when exposed to identical pressures upstream and downstream of the restrictor. But it drastically reduces sensitivity of the calculated flow to mismatches in gain and nonlinearity of the two transducers, since these don't affect the reading from the differential transducer at zero flow.

Use of a differential pressure transducer also significantly reduces the impact of uncorrected zero drift of the transducers over time or temperature, since only the drift from one transducer contributes to the differential pressure measurement.

Use of a differential pressure transducer does not completely eliminate the sensitivity of the differential transducer to pressure, since differential transducers usable in this application typically have some "common-mode" sensitivity (i.e. a small shift in zero as a function of absolute pressure). But this common-mode sensitivity is usually small, can be easily and inexpensively measured and almost entirely compensated for, and should change very little over either temperature or the life of the transducer.

However, using both a differential transducer and a separate absolute transducer has drawbacks as well:

Cost. One of the major drivers behind the cost of pressure transducers is simply the cost of the wetted materials and their fabrication and processing. For environments (like most semiconductor industry applications) requiring that the sensing elements be isolated from the medium being sensed, the cost of transducers is heavily driven by the number of diaphragms or other isolation membranes required. A wet/wet differential pressure transducer has 2 high-purity diaphragms and associated seals exposed to the medium being sensed, so costs substantially more both to buy and to install than the absolute transducer it replaces.

Size. Typical differential transducers are larger than absolute transducers, and typically require plumbing connections that are inconvenient in a typical low-range MFC or MFM standard form factor.

Reliability. Every seal and isolation membrane provides a possible failure point. All else being equal, a system with 3 pressure transducer seals and 3 isolation membranes is likely to suffer 50% more seal and isolation membrane failures than a comparable system with only 2 seals and isolation membranes.

To overcome some of these problems, the present disclosure provides for a combination absolute and differential pressure transducer that is suitable for use in pressure-based flow meters and flow controllers. An example of one embodiment of the combination absolute and differential pressure transducer in accordance with the disclosed embodiments is depicted in the drawings.

Although the following discussion applies primarily to gas flow meters, the combination absolute and differential pressure transducer disclosed herein may also be useful in a liquid flow controller (where it could provide information useful to the control system), even though liquid flow meters are relatively insensitive to absolute pressure so are otherwise typically well-served using only a differential transducer. Additionally, although the following discussion is directed toward MFCs and MFMs, at least some of the same issues affect pressure-based volumetric flow meters for gases (GFMs).

Figure 2:
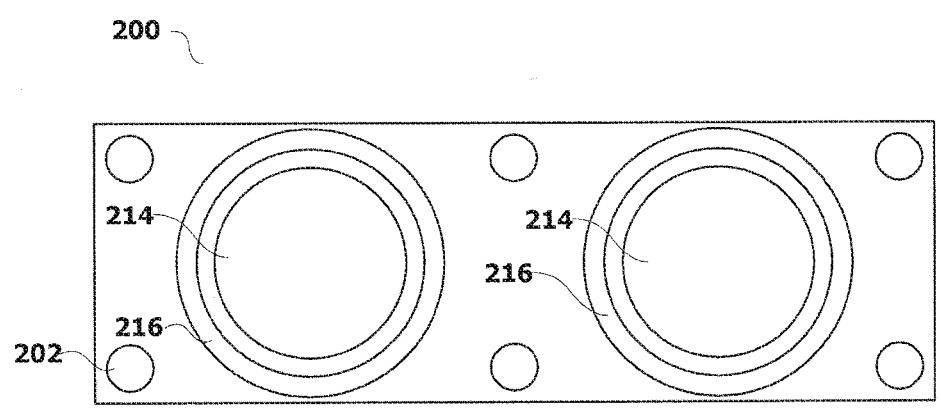
FIG. 2 illustrates a face view of a combination absolute and differential pressure transducer in accordance with one embodiment of the claimed inventions.
Figure 3:
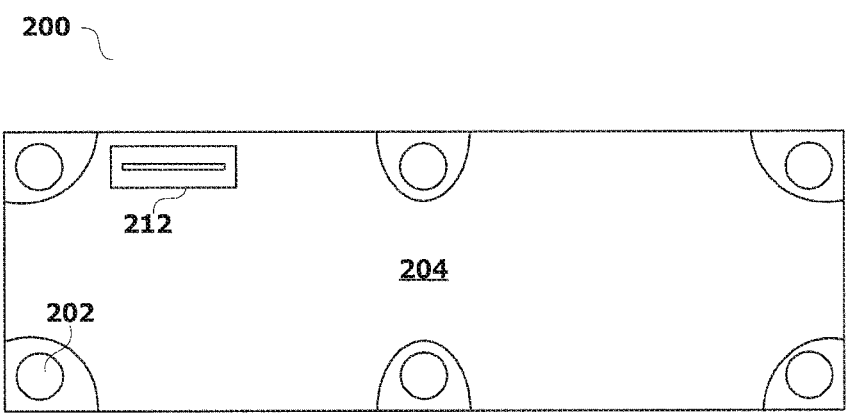
FIG. 3 illustrates a back view of a combination absolute and differential pressure transducer in accordance with one embodiment of the claimed inventions.

FIGS. 1-3 respectively illustrate cross-section, face, and back views of a combination absolute and differential pressure transducer 200 in accordance with one embodiment of the claimed inventions. An exemplary size of the combination absolute and differential pressure transducer 200 may be 50 mm by 26 mm.

Referring to FIGS. 1 through 3, in one embodiment the combination absolute and differential pressure transducer 200 includes a body 208 having at least two cavities 210 exposed to pressures upstream of the flow meter via pressure ports 216 and isolation membranes 214.

As an example, in one embodiment, the pressure port 216 is a seal detail machined into the face of the body; isolation membrane 214 is a flexible corrugated metal diaphragm, and the cavities 210 are filled with a silicone oil or other suitable liquid.

In one embodiment, the combination absolute and differential pressure transducer 200 includes an absolute pressure sense element 220 for reporting the absolute pressure in one of the liquid-filled cavities 210. In one embodiment, the absolute pressure sense element 220 could be a piezoresistive semiconductor pressure sensor, although other technologies could be used.

Also, in the disclosed embodiments, the combination absolute and differential pressure transducer 200 includes a differential pressure sense element 230 for reporting the differential pressure between the liquid-filled cavities. In one embodiment, the differential pressure sense element 230 could be a second piezoresistive semiconductor pressure transducer, although other technologies could be used.

Although FIG. 1 shows one pressure sense element located in each of the liquid-filled cavities 210, in certain embodiments the combination absolute and differential pressure transducer 200 may be fabricated with both the absolute pressure sense element 220 and the differential pressure sense element 230 located in the same liquid-filled cavity 210.

In another embodiment, the combination absolute and differential pressure transducer 200 may be fabricated with an absolute pressure sense element 220 in each liquid-filled cavity 210, in addition to the differential pressure sense element 230. This embodiment would allow detection of some pressure transducer failures (such as long-term drift or uncompensated zero or span tempco errors) not detectable with only one absolute plus one differential pressure sense element.

In one embodiment, a circuit board 204 is attached to the back of the transducer body 208. In certain embodiments, the circuit board 204 includes flash memory and a flex cable connector 212. The circuit board 204 may also provide a location to mount any transducer-specific balance or other trim resistors. In certain embodiments, the circuit board 204 could also provide instrumentation amps needed to amplify the embedded pressure transducer outputs, some or all of the required drive circuitry, current sense resistors needed either by a constant-current drive or to sense transducer temperature with a constant voltage drive, storage for transducer calibration or other desired data, etc. The circuit board 204 may be supported by pins from the transducer body 208 providing the electrical connections with the pressure sense elements 220 and 230 contained within the body. In some embodiments, the circuit board 204 may include one or more notches 202 or holes to provide clearance around transducer mounting screw heads.

In certain embodiments, the combination absolute and differential pressure transducer 200 may include a temperature sensor 240. The temperature sensor 240 may be used to compensate for any gauge temperature coefficient, and as a proxy for temperature of the fluid for which flow is to be calculated. In one embodiment, the temperature sensor 240 may be embedded in the transducer body 208 as illustrated in FIG. 1 to obtain an average measurement. Non-limiting examples of the temperature sensor 240 include using a thermocouple, thermistor, RTD, or another integrated circuit device.

In other embodiments, temperature(s) may be determined by measuring resistance of a strain gage bridge embedded in one or more of the absolute 220 or differential 230 pressure sense elements, and converting measured resistance to temperature.

In one embodiment, the isolation membranes 214 consist of thin flexible diaphragms manufactured from any suitable metal such as high-purity stainless steel or Hastelloy®, or other suitable materials; are manufactured to have a precisely-specified profile (e.g., profile specified to +−0.15 mm); and are positioned to project slightly from the face of the transducer body 208. This embodiment is useful in gas flow controllers, which for low flow ranges suffer from long bleed-down times following valve closure. This bleed-down time results from the gas occupying the volume between the upstream control valve and the laminar flow element, which must bleed out through the laminar flow element. In accordance with the disclosed embodiments, providing a precisely-controlled isolation membrane shape allows for easier fabrication of the device to which the transducer structure attaches, while still minimizing this volume, and thus minimizing the bleed-down time.

In another embodiment, the pressure port 216 might be manufactured to include a rigid cover over most of the isolation membrane, providing only a small and precisely controlled gap between the membrane and the cover to similarly minimize volume and the resulting bleed-down time.

In other embodiments, the pressure ports may be flush with or retracted from the mounting face of the transducer body 208.

Still, in some embodiments, other materials or devices, such as, but not limited to, a bellows may be used as an isolation membrane.

In certain embodiments, the transducer body 208 may be made of corrosion-resistant metal alloys such as, but not limited to, HasteHoy® or 316L VIM-VAR for all surfaces exposed to a gas/liquid path. Other surfaces could be made of any convenient stainless steel.

Figure 4:
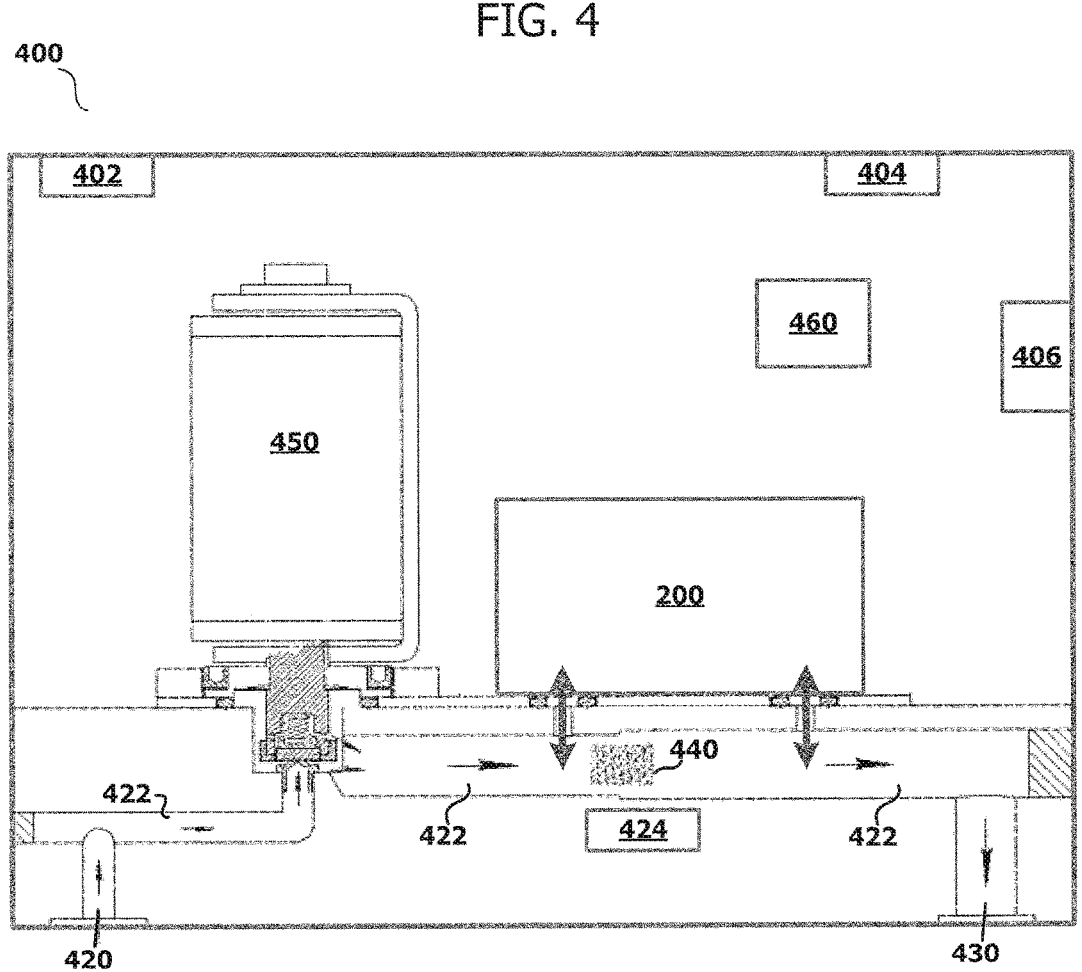
FIG. 4 illustrates an example of a mass flow controller in which embodiments of a combination absolute and differential pressure transducer in accordance the disclosed embodiments may be incorporated.

FIG. 4 schematically illustrates an example of a pressure based mass flow controller 400 in which an embodiment of the combination absolute and differential pressure transducer 200 may be incorporated. The pressure based mass flow controller 400 operates on the principle that changes in fluid flow rate produce changes in the fluid pressure upstream and or downstream of a flow restrictor, from which the fluid flow rate can be calculated.

In the depicted embodiment, the mass flow controller 400 includes, among other things, a power supply connector 402, a display interface 404, a communications interface 406 (e.g., an RS485 communication interface connector), control electronics 460, a fluid pathway 422, one or more temperature sensors/sensing elements 424, a flow control valve assembly 450, and at least one embodiment of the disclosed combination absolute and differential pressure transducer 200.

The mass flow controller 400 further includes an inlet port 420 for introducing a fluid into the device and outlet port 430 from which the fluid exits (e.g., to a processing chamber). The fluid flows within the mass flow controller 400 along the fluid pathway 422. In some embodiments, the fluid pathway 422 is maintained at a constant temperature using a heater and the one or more temperature sensors (such as temperature sensor 424 and/or in certain embodiments, temperature sensor 240) for sensing the temperature(s) along the fluid pathway 422.

In the depicted embodiment, the flow control valve assembly 450 is positioned along the fluid pathway 422 near the inlet port 420. The flow control valve assembly 450 includes a proportional control valve that is adjustable to control the amount of fluid passing through the Mass flow controller 400.

Additionally, the mass flow controller 400 includes a laminar flow element 440. The laminar flow element 440 is configured to ensure laminar flow within small flow channels, creating a pressure drop due to shear forces within the fluid. Additionally, in some embodiments, the one or more temperature sensors 424 and/or temperature sensor 240 may be configured to provide a temperature of the fluid in the laminar flow element 440.

The combination absolute and differential pressure transducer 200 is coupled to the fluid pathway 422 downstream from the flow control valve assembly 450. The combination absolute and differential pressure transducer 200 determines the absolute pressure and the differential pressure drop across the laminar flow element using at least one absolute pressure sense element and at least one differential pressure sense element exposed to differential pressure between at least two cavities of the combination absolute and differential pressure transducer 200 as described above.

In one embodiment, the mass flow controller 400 includes control electronics 460 that may comprise of logic, circuitry, memory, and one or more processing elements (processors). Control electronics 460 is configured to control the position of the valve within the flow control valve assembly 450 in accordance with a set point indicating the desired mass flow rate. For instance, in one embodiment, the control electronics 460 receives the temperature of the fluid in the laminar flow element 440 from a temperature sensing element such as temperature sensor 424 and/or temperature sensor 240, the absolute pressure and the differential pressure from the combination absolute and differential pressure transducer 200, and a setpoint signal indicative of a desired flow rate through the laminar flow element. The control electronics 460 uses the received information to convert the absolute pressure, the differential pressure, and knowledge of both the temperature-dependent fluid properties and characteristics of the laminar flow element into a signal indicative of mass flow rate through the laminar flow element. For example, in one embodiment, the control electronics 460 is configured to use the Hagen-Poiseuille equation to relate the pressure drop to a volumetric flow rate, which is then converted to a mass flow rate using density correction at a given temperature and pressure. The control electronics 460 then generates a valve drive signal for controlling the proportional control valve such that the signal indicative of mass flow rate through the laminar flow element substantially matches the received setpoint signal. For example, in one embodiment, a control valve drive signal is generated based upon an error signal that is the difference between the set point signal indicative of the desired mass flow rate of the fluid and a feedback signal that is related to the actual mass flow rate determined by the control electronics 460 using the combination absolute and differential pressure transducer 200.

Figure 5:
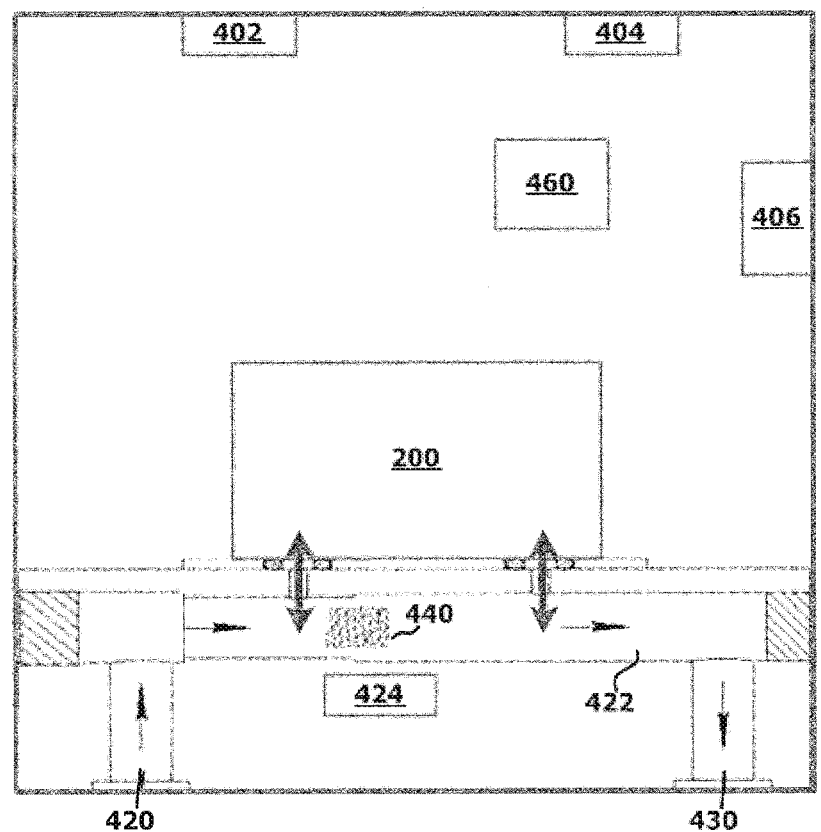
FIG. 5 illustrates an example of a mass flow meter in which embodiments of a combination absolute and differential pressure transducer in accordance the disclosed embodiments may be incorporated.

FIG. 5 schematically illustrates an example of a pressure based mass flow meter 500 in which an embodiment of the combination absolute and differential pressure transducer 200 may be incorporated. The pressure based mass flow meter 500 includes similar components to that of the mass flow controller 400 except that the mass flow meter 500 and control electronics 160 simply determine a mass flow rate of the fluid passing through the device and do not control the amount of fluid. As such, the mass flow meter 500 lacks the flow control valve assembly 450 as described in the mass flow controller 400.

Accordingly, the disclosed embodiments provide for various embodiments of a combination absolute and differential pressure transducer that is suitable for use in pressure-based mass flow meters and mass flow controllers for both gas and liquids.

While the foregoing has described and depicted what is considered to be the best mode and/or other examples, it is understood that various modifications may be made therein and that the subject matter disclosed herein may be implemented in various forms and examples, and that the teachings may be applied in numerous applications, only some of which have been described herein. Those skilled in the art will recognize that the present disclosure is amenable to a variety of modifications and/or enhancements. Such modifications are intended to be covered within the true scope of the present teachings.

For example, although the drawings show the combination absolute and differential pressure transducer 200 as a single mechanical body with both pressure ports (the corrugated diaphragms) on the same face of the body, which is applicable for use with a mass flow controller having a form factor similar to other small commercially-available MFCs, other configurations in accordance with the disclosed embodiments may have the pressure ports on opposite ends of the combination absolute and differential pressure transducer 200 or on adjacent faces. Still, in certain embodiments, the combination absolute and differential pressure transducer 200 may be manufactured as two discrete mechanical units (probably either rectangular or cylindrical) that are connected by a liquid-filled flexible tube.

Further, in certain embodiments, the combination absolute and differential pressure transducer 200 includes more than two cavities. For example, a 2-input single-output mixing flow controller might be built around two laminar flow elements and a single 3-cavity absolute and differential pressure transducer. In some embodiments, the 3-port combined pressure transducer might have an absolute transducer in one cavity (and exposed to the pressure downstream of both laminar flow elements), a separate cavity exposed to the pressure upstream of each laminar flow element, and two differential transducers each reporting the pressure drop across one of the laminar flow elements.

As used herein, the singular forms "a", an and the are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

As stated above, many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A combination absolute pressure and differential pressure transducer comprising:
   at least a first cavity and a second cavity;
   at least a first pressure port and a second pressure port;
   a first isolation membrane exposing the first cavity to a first fluid pressure applied to the first pressure port;
   at least a second isolation membrane exposing the second cavity to a second fluid pressure applied to the second pressure port;
   at least one absolute pressure sense element exposed to absolute pressure in one of the first cavity and the second cavity; and
   at least one differential pressure sense element exposed to differential pressure between the first cavity and the second cavity.

2. The combination absolute pressure and differential pressure transducer of claim 1, wherein at least one of the first cavity and the second cavity is filled with liquid.

3. The combination absolute pressure and differential pressure transducer of claim 1, wherein at least the first cavity and the second cavity are formed within a single body.

4. The combination absolute pressure and differential pressure transducer of claim 1, wherein at least the first cavity and the second cavity are formed within separate bodies.

5. The combination absolute pressure and differential pressure transducer of claim 1, further comprising at least one temperature sensitive element thermally coupled to at least one of the first cavity and the second cavity.

6. The combination absolute pressure and differential pressure transducer of claim 5, wherein the combination absolute pressure and differential pressure transducer is configured to use the temperature sensitive element to compensate for any gauge temperature coefficients.

7. The combination absolute pressure and differential pressure transducer of claim 1, further comprising a circuit board coupled to a transducer body.

8. The combination absolute pressure and differential pressure transducer of claim 7, wherein the circuit board further comprises memory configured to store data including calibration data for the combination absolute pressure and differential pressure transducer.

9. The combination absolute pressure and differential pressure transducer of claim 8, wherein the circuit board further comprises instrumentation amplifiers and circuitry whose behavior affect a calibration of pressure signals provided by the combination absolute pressure and differential pressure transducer.

10. The combination absolute pressure and differential pressure transducer of claim 7, wherein the circuit board further comprises an accelerometer capable of indicating a magnitude and direction of any net gravitational and acceleration forces to which the combination absolute pressure and differential pressure transducer is exposed.

11. The combination absolute pressure and differential pressure transducer of claim 1, wherein at least one of the first isolation membrane and the second isolation membrane is a flexible corrugated metal diaphragm.

12. The combination absolute pressure and differential pressure transducer of claim 1, wherein at least one of the first isolation membrane and the second isolation membrane has a precisely-specified profile that is proud of a mounting face of the combination absolute pressure and differential pressure transducer.

13. The combination absolute pressure and differential pressure transducer of claim 1, wherein all surfaces of the combination absolute pressure and differential pressure transducer that are exposed to process fluid are made of corrosion-resistant metal alloys.

14. A mass flow meter comprising:
   a laminar flow element;
   a combination absolute pressure and differential pressure transducer that includes at least a first cavity and a second cavity, at least a first pressure port and a second pressure port, a first isolation membrane exposing the first cavity to a first fluid pressure applied to the first pressure port, a second isolation membrane exposing the second cavity to a second fluid pressure applied to the second pressure port, at least one absolute pressure sense element exposed to absolute pressure in one of the first cavity and the second cavity, and at least one differential pressure sense element exposed to differential pressure between the first cavity and the second cavity;

a temperature sensing element configured to provide a temperature of the fluid in the laminar flow element; and a processing element configured to convert the temperature of the fluid, the absolute pressure, the differential pressure, and knowledge of fluid properties and laminar flow element characteristics into a signal indicative of mass flow rate through the laminar flow element.

15. The Mass flow meter of claim 14, wherein the temperature sensing element that is configured to provide the temperature of the fluid in the laminar flow element is incorporated within the combination absolute pressure and differential pressure transducer.

16. The mass flow meter of claim 15, wherein the temperature sensing element that is configured to provide the temperature of the fluid in the laminar flow element is thermally coupled to at least one of the first cavity and the second cavity.

17. The mass flow meter of claim 15, wherein the combination absolute pressure and differential pressure transducer is configured to use the temperature sensing element to compensate for any gauge temperature coefficient.

18. A mass flow controller comprising:
a laminar flow element;
a combination absolute pressure and differential pressure transducer that includes at least a first cavity and a second cavity, at least a first pressure port and a second pressure port, a first isolation membrane exposing the first cavity to a first fluid pressure applied to the first pressure port, a second isolation membrane exposing the second cavity to a second fluid pressure applied to the second pressure port, at least one absolute pressure sense element exposed to absolute pressure in one of the first cavity and the second cavity, and at least one differential pressure sense element exposed to differential pressure between the first cavity and the second cavity;

a temperature sensing element configured to provide a temperature of the fluid in the laminar flow element;

a proportional control valve configured to control a flow of fluid through the laminar flow element in response to a valve drive signal;

control electronics configured to convert the temperature of the fluid, the absolute pressure, the differential pressure, and knowledge of fluid properties and laminar flow element characteristics into a signal indicative of mass flow rate through the laminar flow element; receive a setpoint signal indicative of a desired flow rate through the laminar flow element; and control the valve drive signal such that the signal indicative of mass flow rate through the laminar flow element substantially matches the received setpoint signal.

19. The Mass flow controller of claim 18, wherein the temperature sensing element that is configured to provide the temperature of the fluid in the laminar flow element is incorporated within the combination absolute pressure and differential pressure transducer.

20. The mass flow controller of claim 19, wherein the combination absolute pressure and differential pressure transducer is configured to use the temperature sensing element to compensate for any gauge temperature coefficient.

* * * * *